United States Patent
Kölhi et al.

(10) Patent No.: US 10,771,597 B2
(45) Date of Patent: Sep. 8, 2020

(54) SYNCHRONIZED CONNECTION CLOSING (71) Applicant: Telefonaktiebolaget LM Ericsson (publ), Stockholm (SE)

(72) Inventors: Johan Kölhi, Stockholm (SE); John Orre, Stockholm (SE); Robert Skog, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 120 days.

(21) Appl. No.: 16/069,108

(22) PCT Filed: Jan. 11, 2016

(86) PCT No.: PCT/EP2016/050396
§ 371 (c)(1),
(2) Date: Jul. 10, 2018

(87) PCT Pub. No.: WO2017/121459
PCT Pub. Date: Jul. 20, 2017

(65) Prior Publication Data
US 2019/0007527 A1   Jan. 3, 2019

(51) Int. Cl.
*H04L 29/06* (2006.01)
*H04L 29/08* (2006.01)
*H04L 12/26* (2006.01)
*H04W 76/25* (2018.01)

(52) U.S. Cl.
CPC ............ *H04L 69/163* (2013.01); *H04L 43/10* (2013.01); *H04L 67/143* (2013.01); *H04L 67/145* (2013.01); *H04W 76/25* (2018.02)

(58) Field of Classification Search
CPC ..... H04L 69/16; H04L 67/143; H04L 67/145; H04L 43/10; H04W 76/25
See application file for complete search history.

(56) References Cited

U.S. PATENT DOCUMENTS

| 2002/0177461 A1* | 11/2002 | Rosen ............... H04M 3/42 455/518 |
| 2007/0244987 A1* | 10/2007 | Pedersen ............ H04L 69/10 709/217 |
| 2011/0213893 A1 | 9/2011 | Morris |

FOREIGN PATENT DOCUMENTS

WO    02/093778 A1    11/2002

OTHER PUBLICATIONS

International Search Report and Written Opinion issued in International Application No. PCT/EP2016/050396, dated Oct. 7, 2016, 11 pages.

* cited by examiner

*Primary Examiner* — Kent Krueger
(74) *Attorney, Agent, or Firm* — Rothwell, Figg, Ernst & Manbeck, P.C.

(57) ABSTRACT

A method for a network element in a network, through which network element a communications device can communicate with the network via one or more connections, the method comprising: detecting traffic for the one or more connections from the communications device; in response to no traffic being detected on a connection for a first time period, closing each connection for which no traffic has been detected for a second time period, among the one or more connections. Corresponding network element is also provided.

22 Claims, 4 Drawing Sheets

SYNCHRONIZED CONNECTION CLOSING

CROSS REFERENCE TO RELATED APPLICATION(S)

This application is a 35 U.S.C. § 371 National Stage of International Patent Application No. PCT/EP2016/050396, filed Jan. 11, 2016, designating the United States, the disclosure of which is incorporated by reference.

TECHNICAL FIELD

The present disclosure relates to communications, particularly to a method and apparatus for synchronized connection closing.

BACKGROUND

With ever growing amount of smart handheld users, comes the ever growing amount of client applications, comprising those with keep-alive features.

According to some data analysis, in a 24-hour time period, a keep-alive application set to poll for updates every 5 minutes will generate 298 connection attempts. Daily connection attempts for popular keep-alive applications, for example, for Yahoo Email are 240 attempts, for Twitter are 90 attempts, for ESPN are 130 attempts, for Facebook are 125 attempts, and for Yahoo IM are 360 attempts. If a keep-alive application requests access to the network while the device is dormant it might take up to 30 signaling events for the radio to switch from idle to a state where data can be exchanged. Take one of the most popular smart handheld systems for example, android users have an average of 35 applications, and there are more than 300 million Android smart phones worldwide. The chattiest applications can generate upwards of 2400 network signaling events per hour, most of the time without user knowledge. This could amount to up to 25,200,000,000,000 signaling events per hour worldwide! Then impact on handheld users could be stolen bandwidth of 212 Mb/month/user and may cause sluggish wireless network or even no network connection, and the users may not make calls or connect to applications.

This background activity from chatty mobile applications creates congestion which can lead to network flooding where the wireless network is overwhelmed with constant requests to connect. Wireless carriers experience increased costs as they are forced to increase wireless network capacity in response to this. Further, individual subscribers experience lower service levels and shorter battery life.

One solution to address this problem is to apply traffic optimization software on the client to relieve network congestion by significantly reducing mobile signaling and bandwidth consumption. The software manages the exchange of control information and content between mobile devices and the network, using a client-based virtualized proxy and caching technology. It analyzes mobile application data requests, transparently detecting redundant traffic patterns and caching the results of unnecessary requests on the client. An Open Channel server polls for updates, so that the client connects to the network only when updates are available. On-device caching reduces unnecessary data traffic. However, such a solution requires the software to be installed on all the smart phones, which is unfeasible.

SUMMARY

Therefore, it is an object of the present disclosure to solve at least one of the above-mentioned problems.

According to one aspect of the embodiments, there is provided a method for a network element in a network, through which network element a communications device can communicate with the network via one or more connections, the method comprising: detecting traffic for the one or more connections from the communications device; in response to no traffic being detected on a connection for a first time period, closing each connection for which no traffic has been detected for a second time period, among the one or more connections.

According to another aspect of the embodiments, there is provided a network element in a network, through which network element a communications device can communicate with the network via one or more connections, the network element comprising: a detector for detecting traffic for the one or more connections from the communications device; and a closer for closing each connection for which no traffic has been detected for a second time period, among the one or more connections in response to no traffic being detected on a connection for a first time period.

According to a third aspect of the embodiments, there is provided a network element in a network, through which network element a communications device can communicate with the network via one or more connections, the network element comprising: a memory, adapted to store data and instructions therein; and a processing system, adapted to perform the steps of the method described above; a network interface, adapted to communicate data with other network elements, including the user device; a communication medium, adapted to facilitate communication among the memory, the processing system, and the network interface.

According to a further aspect of the embodiments, there is provided a computer program product, which comprises instructions for implementing the steps of the method as described above.

According to a still further aspect of the embodiments, there is provided a recording medium which stores instructions for implementing the steps of the method as described above.

By scenarios or as a whole, the present disclosure will probably decrease battery usage of smart handsets and improve the utilization of the radio network resources.

BRIEF DESCRIPTION OF THE DRAWINGS

The invention will be described in detail by reference to the following drawings, in which.

DETAILED DESCRIPTION

Embodiments of the present disclosure will be described more fully hereinafter with reference to the accompanying drawings, in which embodiments of the disclosure are shown. This invention may, however, be embodied in many different forms and should not be construed as limited to the embodiments set forth herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present disclosure is described below with reference to block diagrams and/or flowchart illustrations of methods, device (systems) and/or computer program products according to embodiments of the disclosure. It is understood that blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present disclosure may be embodied in hardware and/or in software (including firmware, resident software, micro-code, etc.). Furthermore, the present disclosure may take the form of a computer program product on a computer-usable or computer-readable storage medium having computer-usable or computer-readable program code embodied in the medium for use by or in connection with an instruction execution system. In the context of this disclosure, a computer-usable or computer-readable medium may be any medium that can contain, store, communicate, propagate, or transport the program for use by or in connection with the instruction execution system, apparatus, or device.

Embodiments of the disclosure will be described below with reference to the drawings.

Figure 1:
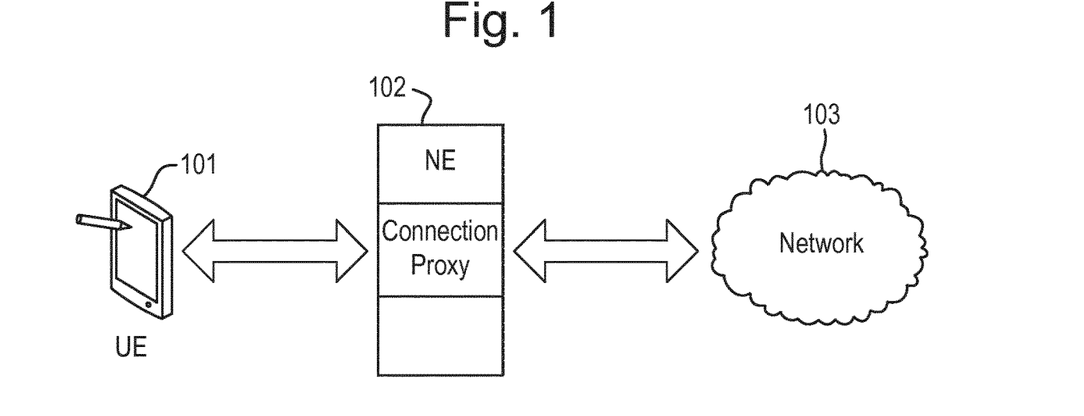
FIG. 1 illustratively shows an environment in which embodiments of the disclosure are implemented.

FIG. 1 illustratively shows an environment in which embodiments of the disclosure are implemented. Although embodiments of the disclosure are applied to network environment with TCP connections, it should be construed that embodiments of the disclosure should not be limited to TCP connections only, but also other kinds of connections, as long as they are connection oriented. The Environment comprises a communications device 101, a network element (NE) 102 and a network 103.

For simplicity and clarity, there is only one communications device illustrated. It will be appreciated that different numbers of communications devices may be served by the same NE 102 at the meantime. The term "UE" used herein may indicate all forms of devices enabled to host keep alive applications, such as those popular smart mobile telephones ("cellular" telephones) and laptops with mobile termination, and thus can be, for example, portable, pocket, hand-held devices, such as smart phones, personal digital assistants (PDA); computer-included devices, such as desktops, laptops; vehicles, or other devices, such as meters, household appliances, medical appliances, multimedia devices, etc., which communicate voice and/or data with a wireless network. Besides, it is noted that embodiments of the disclosure could not only be applied to an environment where the communications device 101 connects to the NE 102 by wired connection, but also an environment where the communications device 101 connects to the NE 102 wirelessly. Therefore, the communications device 101 should not be limited to wireless communications devices, but also wired communications devices with keep alive applications.

Generally, a keep alive message is a message sent by one device to a server to check that the link between the two is operating, or to prevent this link from being broken. In the context, the keep alive application refers to an application that requires a constant logical connection to the network, or say, that is connection oriented. An active keep alive application refers to a keep alive application that has already established a connection to the network. Transmission Control Protocol (TCP) keep alive messages are an optional feature of TCP. A TCP keep alive packet contains null data. In an Ethernet network, a keep alive frame length is 60 bytes, while the server response to this, also a null data frame, is 54 bytes. 'Keep alive time' is the duration between two keep alive transmissions during an idle condition. 'Keep alive interval' is the duration between two successive keep alive retransmissions, if acknowledgement to the previous keep alive transmission is not received. 'Keepalive retry' is the number of retransmissions to be carried out before declaring that remote end is not available.

The NE 102 is configured for connecting the communications device 101 to the network 103 over connections such as TCP connections. As has been mentioned above, the connections could be either wired or wireless. The NE 102 could be a connection proxy node such as a TCP proxy node, or any other network element with such connection proxy functionality, for example, it could be a multi-service proxy, such as Ericsson Multiservice Proxy. The Ericsson Multi-service Proxy is a multi-purpose, multi-technology network node that provides service control, enables policy control while representing an integration point for value-added services. The connection proxy functionality could be integrated into the Ericsson Multiservice Proxy. The connection proxy may be a transparent proxy. In particular, the proxy may be a transparent proxy that takes all TCP traffic to and from the communications device. The proxy may be a gateway proxy. The proxy may reside in a gateway network element, or the gateway network element may be arranged to send and receive all TCP-traffic to and from the proxy as a separate network element. The gateway network element may comprise the Packet Data Network Gateway, or the Gateway GPRS Support Node, for example. The proxy may generate new TCP connections or simply let TCP traffic pass through. A user of the communication device will not be aware of the proxy but will enjoy the performance improvements it brings.

The Network 103 could be a wired network, such as Intranet, Internet, LAN, WAN etc., or a wireless network, such as LTE, LTE-A, WLAN, WWAN, etc.

Figure 2A:
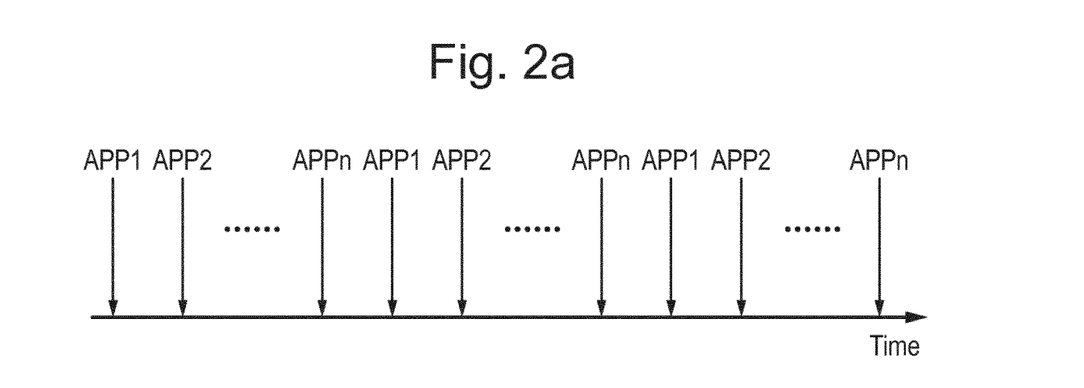
FIG. 2a illustratively shows a general scenario where active keep alive applications are not synchronized.

FIG. 2a illustratively shows a general scenario where active keep alive applications are not synchronized. Generally, the keep alive applications running on the communications device 101 are not synchronized. Suppose there are n active keep alive applications running on the communications device 101, then the connection attempts sent from each application to maintain its connection to the network could be those shown in FIG. 2a. Please be noted the intervals among different connection attempts from respective applications are not drawn to scale and are only exemplary rather than restrictive, and intervals of successive connection attempts sent from one application to keep alive are generally the same. Generally, one connection corresponds to one application.

Figure 2B:
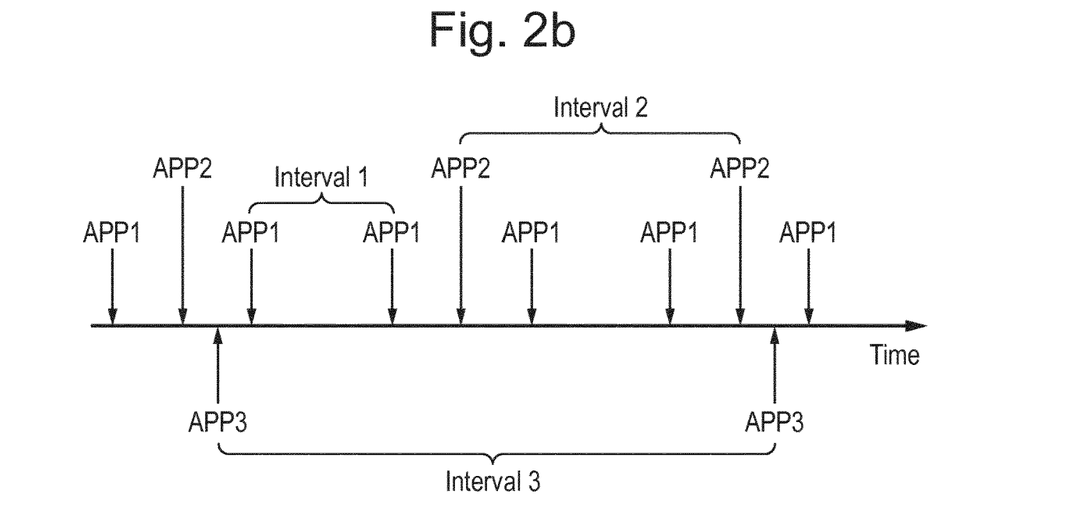
FIG. 2b illustratively shows a way to choose the time period according to one embodiment of the present disclosure.

Take a further look at FIG. 2b. Suppose number of active keep alive applications is three and the three are application 1, application 2 and application 3 (shown as APP1, APP2 and APP3 respectively in FIG. 2b), the intervals for successive connection attempts of application 1 are the same, shown as Interval 1, for application 2 are also the same, shown as Interval 2, and for application 3 are still the same, shown as Interval 3, wherein: Interval 1<Interval 2<Interval 3.

Figure 3:
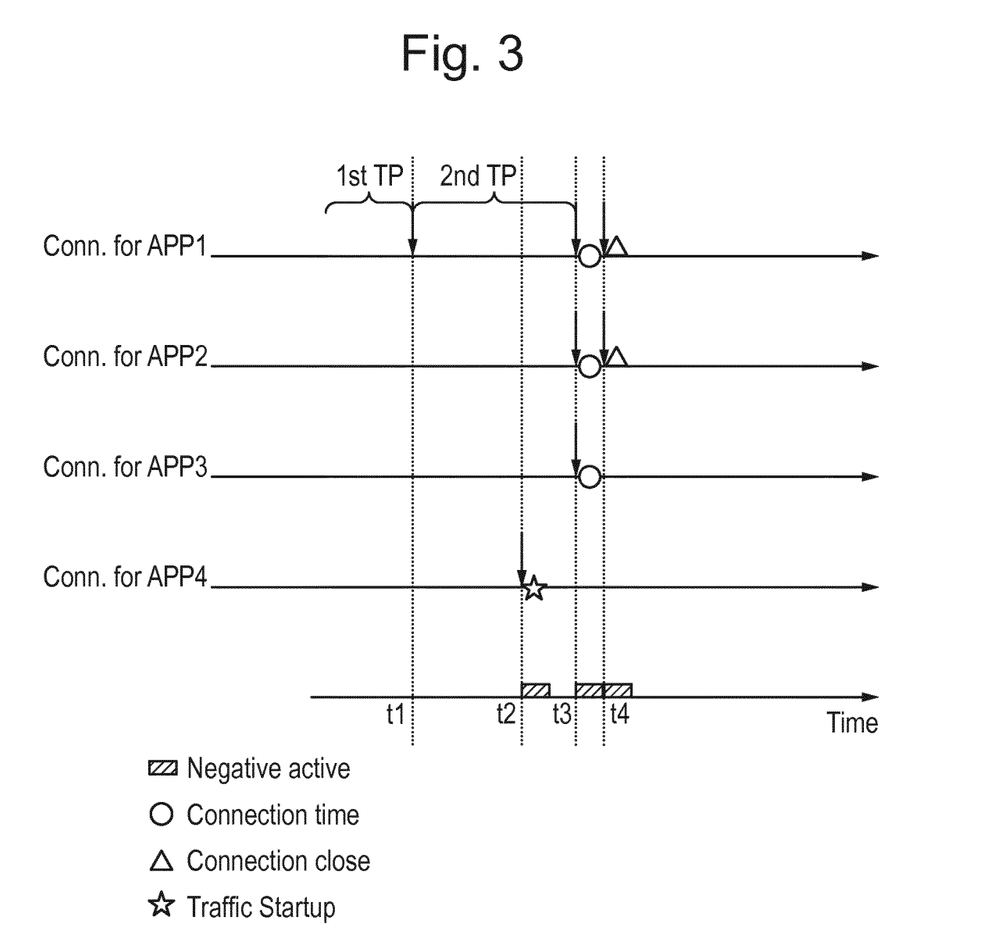
FIG. 3 illustratively shows events happening in timeline in accordance to one embodiment of the disclosure.
Figure 4:
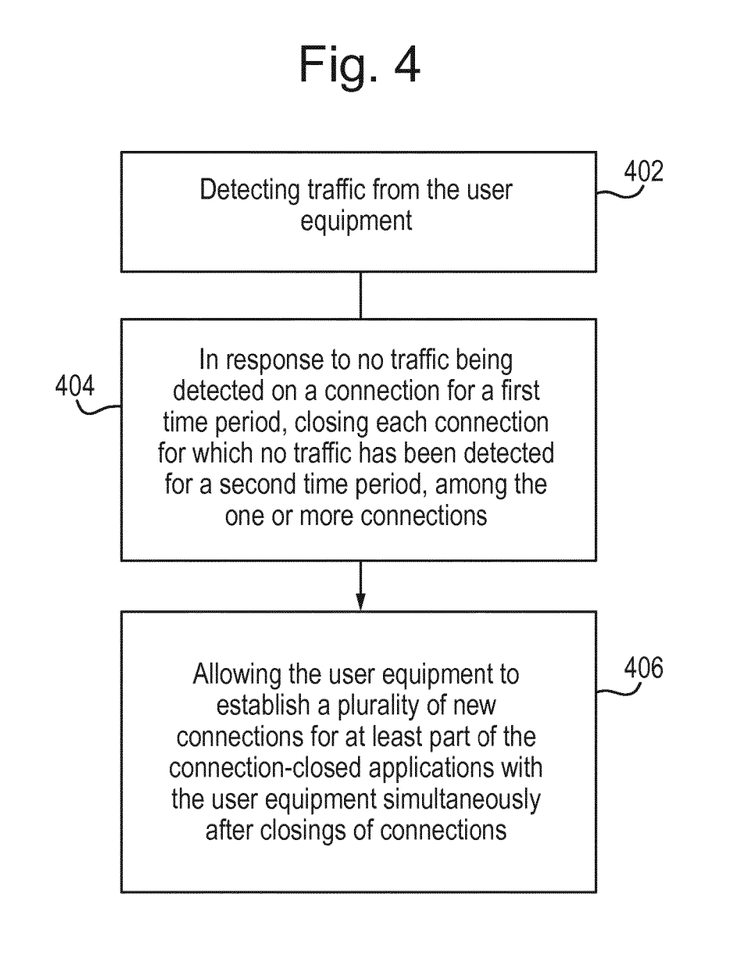
FIG. 4 illustratively shows a method for a network element in accordance to one embodiment of the disclosure.

FIG. 3 illustratively shows events happening in timeline in accordance to one embodiment of the disclosure. FIG. 4 illustratively shows a method for a network element in accordance to one embodiment of the disclosure. Generally, at step 402, the NE detects traffic from the communications device 101. By traffic we mean packets on one or more connections from applications running on the communications device.

In response to no traffic being detected on a connection for a first time period (TP), the NE 102 closes each connection for which no traffic has been detected for a second time period at step 404. It is noted the second time period should be set to be no longer than the shortest keep alive message interval, preferably be set as the shortest keep alive message interval so that a connection that is actively sending data will not closed, but a connection that is only sending keep alive messages will be closed. The first time period is the amount of time that a connection is allowed to be idle for. For a TCP connection this is the TCP idle time and this is configured when the TCP connection is created. The idle time is the length of time for which a connection can remain open but carry no messages. It is worth noting that the presence of an idle time is what prompts the need for keep alive messages, the keep alive messages are used to prevent the connection being idle for longer than the idle time and thus to avoid the connection being closed. The first time period causes the process to be triggered when one connection is identified as being idle for a time period that, in some examples, is equivalent to the TCP idle time. A second test for the second period of time ensures that any application that has just started connection, does not have its connection closed. The second time period corresponds to the shortest keep alive message interval for all the connections. Not all connections will be closed once the second time period elapses because some may not meet the condition of still no traffic being detected during the second time period. For the example shown in FIG. 2b, the first time period and/or the second time period is preferably set as Interval 1, which is the connection idle time. Generally, one connection corresponds to one keep alive application.

Additionally or alternatively, closing a connection comprises sending a close request to the communications device. Additionally or alternatively, the close requests comprise, for example, TCP FIN (finish) messages, or TCP RST (reset) messages for TCP connections. Additionally or alternatively, closings of connections for which no traffic has been detected for a second time period among the one or more connections are synchronized. For example, those close requests will be sent in a same radio channel in a batch and thus the radio resource utilization efficiency can be increased.

Additionally or alternatively, the communications device 101 may send several connection establishing requests to establish a plurality of new connections between part or all of the connection-closed applications and the communications device 101 simultaneously. The messages carried by the new connections are substantially synchronized. These messages may be synchronized such that messages from different ones of the new connections are sent at substantially the same time. These messages may be sent in batches. Additionally or alternatively, later at step 406, the NE 102 may allow the communications device to establish a plurality of new connections between part or all of the connection-closed applications and the communications device 101 simultaneously. Such connection establishment may happen immediately after the closing of connections above. In this way, for radio communications, the newly established connections can be synchronized and thus can use the same radio-channel between the communications device 101 and the NE 102, and there is no need to set up radio connections for each keep alive application. Signaling for radio connection setup is thus greatly reduced. Then subsequent messages on the newly established connections can be sent in one batch every time. Thus the radio channel does not have to be awaken as frequently, which reduces the amount of signaling required. As a result, hardware resources and radio resources are greatly conserved. Accordingly, at least communications device battery life is extended and service levels are improved, and as the wireless network bandwidth can be conserved, the need for wireless infrastructure upgrades can be delayed and the wireless operator costs are thus reduced.

Take FIG. 3 for a specific example. There are four connections for applications 1, 2, 3 and 4 respectively between the communications device 101 and the NE 102. The NE 102 detects no traffic in a connection for application 1 during a first time period, and thus sets a time counter at the end of the first time period, t1. Then during a second time period, i.e., before the time counter expires, the NE still detects no traffic in connections for applications 1, 2 and 3, but detects a traffic (marked as a star in FIG. 3) in connection for application 4 at t2, then once the time counter expires, i.e., at t3, the NE 102 sends three connection close requests (marked as points in FIG. 3) for connections for applications 1, 2 and 3 respectively, for example FIN messages or RST messages, in one batch to the communications device 101, but still keeps the connection for application 4. Then immediately after that, for example at t4, applications 1 and 2, such as emails or chat applications that need TCP heartbeat connections will start establishing new connections (marked as triangles in FIG. 3) with the network, and they will start simultaneously.

Figure 5:
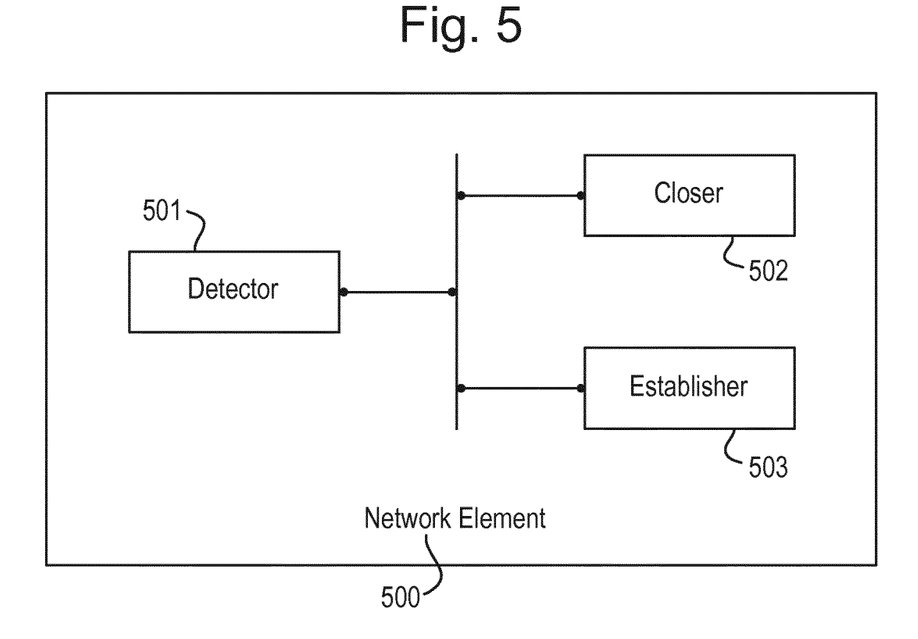
FIG. 5 illustratively shows a block diagram of a network element in accordance to one embodiment of the disclosure.

FIG. 5 illustratively shows a block diagram of a network element in accordance to one embodiment of the disclosure. As is shown in FIG. 5, the network element 500 comprises a detector 501 for detecting traffic from the communications device 101, and a closer 502 for closing one or several connections simultaneously, among the one or more connections to the communications device 101, to close the one or several connections in response to no traffic has been detected for a second time period.

Additionally or alternatively, the network element 500 further comprises an establisher 503 for establishing a plurality of new connections for at least part of the connection-closed applications with the communications device 101 simultaneously after the one or more connections are closed. Additionally or alternatively, the plurality of new connections are established immediately after the one or more connections are closed.

Details of the first time period, second time period and connection close request have been discussed above with reference to FIG. 4 and will not be iterated. Advantages of the embodiment is similar to those illustrated above and will not be iterated either.

Figure 6:
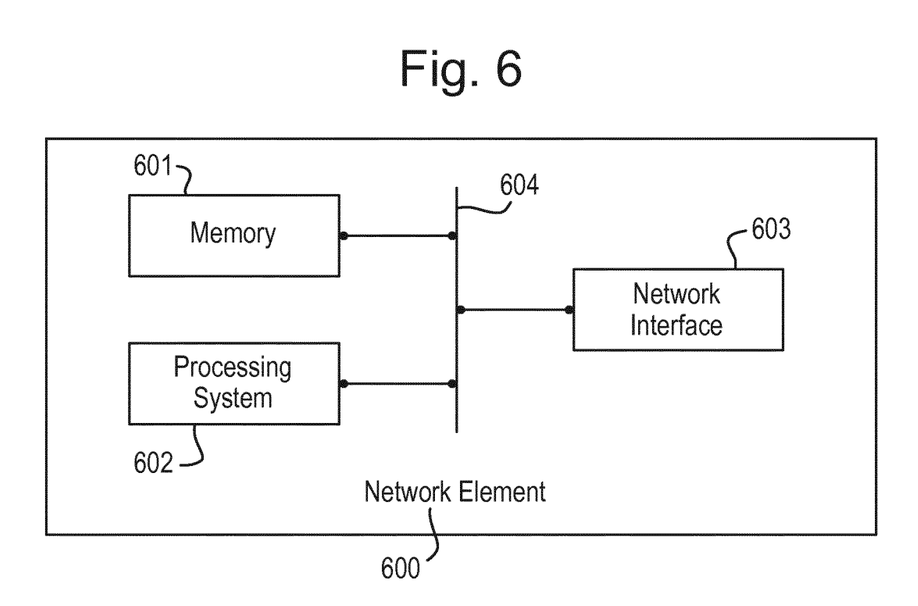
FIG. 6 illustratively shows a block diagram of example physical components of a network element in accordance to one embodiment of the disclosure.

FIG. 6 illustratively shows a block diagram of example physical components of a network element in accordance to one embodiment of the disclosure. It should be appreciated that the network element can be implemented using components other than those illustrated in the example of FIG. 6. The network element generally could be a proxy server, or a software functionality implemented in any network element, etc.

In the example of FIG. 6, the network element 600 comprises a memory 601, a processing system 602, a network interface 603, and a communication medium 604. The memory 601 includes one or more than one computer-usable or computer-readable storage medium capable of storing data and/or computer-executable instructions. Is should be appreciated that the storage medium is preferably a non-transitory storage medium.

The processing system 602 includes one or more than one processing unit. A processing unit is a physical device or article of manufacture comprising one or more integrated circuits that read data and instructions from computer readable media, such as the memory 601, and selectively execute the instructions. In various embodiments, the processing system 602 is implemented in various ways. For example, the processing system 602 can be implemented as one or more than one processing core. In another example, the processing system 602 can comprise one or more than one separate microprocessor. In yet another example embodiment, the processing system 602 can comprise an application-specific integrated circuit (ASIC) that provides specific functionality. In yet another example, the processing system 602 provides specific functionality by using an ASIC and by executing computer-executable instructions.

The network interface 603 is a device or article of manufacture that enables the Network element 600 to send data to or receive data from other SDN controller. In different embodiments, the network interface 603 is implemented in different ways. For example, the network interface 603 can be implemented as an Ethernet interface, a token-ring network interface, a fiber optic network interface, a wireless network interface (e.g., Wi-Fi, WiMax, etc.), or another type of network interface.

The communications medium 604 facilitates communication among the hardware components of the network device 600. In the example of FIG. 6, the communications medium 604 facilitates communication among the memory 601, the processing system 602, and the network interface 603. The communications medium 604 can be implemented in various ways. For example, the communications medium 604 can comprise a PCI bus, a PCI Express bus, an accelerated graphics port (AGP) bus, a serial Advanced Technology Attachment (ATA) interconnect, a parallel ATA interconnect, a Fiber Channel interconnect, a USB bus, a small Computing system Interface (SCSI) interface, or another type of communications medium.

The memory 601 stores various types of data and/or software instructions. For instance, in the example of FIG. 6, the instructions in the memory 601 can include those that when executed in the processing system, cause the network device 600 to implement the methods described herein with reference to FIG. 4.

The embodiments disclosed herein are only software dependent, with no requirements on hardware evolution from the prior art and is thus totally compatible with legacy devices, such as Ericsson Multiservice Proxy.

According to a further aspect of the embodiments, there is provided a computer program product, which comprises the instructions for implementing the steps of the method as described above.

According to a still further aspect of the embodiments, there is provided a recording medium which stores instructions for implementing the steps of the method as described above.

While the exemplary embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from its central scope. Therefore it is intended that the present invention is not be limited to the particular embodiment disclosed as the best mode contemplated for carrying out the present invention, but that the present invention include all embodiments falling within the scope of the appended claims.

The invention claimed is:

1. A method performed by a network element in a network, wherein a communications device can communicate with the network via the network element, the method comprising:
   detecting traffic for a first connection established by the communication device;
   detecting traffic for a second connection established by the communication device; and
   in response to no traffic being detected on the first connection, the second connection, or another connection established by the communication device for a first time period, a) determining, at the end of a second time period that is subsequent to the first time period, whether or not to close the first connection and b) separately determining, at the end of the second time period, whether or not to close the second connection, wherein
   determining whether or not to close the first connection comprises determining whether the first connection was idle during the entire second time period,
   determining whether or not to close the second connection comprises determining whether the second connection was idle during the entire second time period, and
   the method further comprises:
   closing the first connection if it was determined that the first connection was idle during the entire second time period, otherwise refraining from closing the first connection; and
   closing the second connection if it was determined that the second connection was idle during the entire second time period, otherwise refraining from closing the second connection.

2. The method of claim 1, wherein closing the first connection comprises sending a first close request to the communications device.

3. The method of claim 1, further comprising:
determining that the first connection was idle during the entire second time period;
determining that the second connection was not idle during the entire second time period;
closing the first connection as a result of determining that the first connection was idle during the entire second time period; and
refraining from closing the second connection as a result of determining that the first connection was idle during the entire second time period.

4. The method of claim 1, wherein the first and second connections are Transmission Control Protocol (TCP) connections.

5. The method of claim 2, wherein the close request comprises a Transmission Control Protocol (TCP) FIN message.

6. The method of claim 2, wherein the close request comprises a Transmission Control Protocol (TCP) RST message.

7. The method of claim 1, wherein
the first connection has a first keep alive interval,
the second connection has a second keep alive interval
the second keep alive interval is not greater than the first keep alive interval, and
the second time period has the same duration as the second keep alive interval.

8. The method of claim 1, further comprising:
allowing the communications device to establish a plurality of new connections for at least part of the connection-closed applications with the communications device simultaneously after closings of connections.

9. The method of claim 1, wherein the network element is a Transmission Control Protocol (TCP) proxy.

10. The method of claim 7, further comprising:
determining that the second keep alive interval is not greater than the first keep alive interval, and
as a result of determining that the second keep alive interval is not greater than the first keep alive interval, configuring the second time period to have the same duration as the second keep alive interval.

11. A network element in a network, through which network element a communications device can communicate with the network via one or more connections, the network element comprising:
a memory; and
processing circuitry coupled to the memory, wherein the network element is configured to:
detect traffic for a first connection established by the communication device;
detect traffic for a second connection established by the communication device; and
in response to no traffic being detected on the first connection, the second connection, or another connection established by the communication device for a first time period, a) determine, at the end of a second time period that is subsequent to the first time period, whether or not to close the first connection and b) separately determine, at the end of the second time period, whether or not to close the second connection, wherein
the network element is configured to determine whether or not to close the first connection by performing a process that comprises determining whether the first connection was idle during the entire second time period,
the network element is configured to determine whether or not to close the second connection by performing a process that comprises determining whether the second connection was idle during the entire second time period, and
the network element is further configured to:
close the first connection if it was determined that the first connection was idle during the entire second time period, otherwise refraining from closing the first connection; and
close the second connection if it was determined that the second connection was idle during the entire second time period, otherwise refraining from closing the second connection.

12. The network element of claim 11, wherein the network element is configured to close a connection by sending a close request to the communications device.

13. The network element of claim 11, wherein the network element is further configured to:
close the first connection as a result of determining that the first connection was idle during the entire second time period; and
refrain from closing the second connection as a result of determining that the first connection was idle during the entire second time period.

14. The network element of claim 11, wherein the first and second connections are Transmission Control Protocol (TCP) connections.

15. The network element of claim 11, wherein the close request comprises a Transmission Control Protocol FIN message.

16. The network element of claim 11, wherein the close request comprises a Transmission Control Protocol RST message.

17. The network element of claim 11, wherein
the first connection has a first keep alive interval,
the second connection has a second keep alive interval
the second keep alive interval is not greater than the first keep alive interval, and
the second time period has the same duration as the second keep alive interval.

18. The network element of claim 11,
wherein the network element is further configured to allow the communications device to establish a plurality of new connections for at least part of the connection-closed applications with the communications device simultaneously after closings of connections.

19. The network element of claim 11, wherein the network element is a Transmission Control Protocol (TCP) proxy.

20. The network element of claim 17, wherein the network element is further configured to:
determine whether the second keep alive interval is not greater than the first keep alive interval, and
as a result of determining that the second keep alive interval is not greater than the first keep alive interval, configure the second time period to have the same duration as the second keep alive interval.

21. A network element in a network, through which network element a communications device can communicate with the network via one or more connections, the network element comprising:
a memory, adapted to store data and instructions therein; and
a processing system, adapted to perform the steps of claim 1.

22. The network element of claim 21, wherein the network element is a TCP proxy.

* * * * *